United States Patent [19]

Seymour

[11] 4,209,314
[45] Jun. 24, 1980

[54] CONTROLLING GLASS SHEET BUFFETING DURING QUENCHING

[75] Inventor: Samuel L. Seymour, Oakmont, Pa.

[73] Assignee: PPG Industries, Inc., Pittsburgh, Pa.

[21] Appl. No.: 21,035

[22] Filed: Mar. 16, 1979

[51] Int. Cl.² .............................................. C03B 27/00
[52] U.S. Cl. ..................................... 65/104; 65/114; 65/348
[58] Field of Search ................ 65/104, 114, 348, 349, 65/350, 351

[56] References Cited

U.S. PATENT DOCUMENTS

| 2,608,030 | 8/1952 | Jendrisak | 65/107 |
| 3,223,498 | 12/1965 | Davidson | 65/25 A |
| 3,455,672 | 7/1969 | Dompkowski | 65/273 |
| 3,846,104 | 11/1974 | Seymour | 65/104 |
| 4,006,002 | 2/1977 | Hetman | 65/114 |
| 4,076,511 | 2/1978 | Fulton et al. | 65/114 X |
| 4,119,423 | 10/1978 | Seymour | 65/104 |

*Primary Examiner*—Arthur D. Kellogg
*Attorney, Agent, or Firm*—Dennis G. Millman; Edward I. Mates

[57] ABSTRACT

In tempering glass sheets vertically hung from tongs, the uniformity with which tempering medium is applied toward the glass sheets during quenching is improved by providing the quenching apparatus with means to provide finer control of the flow rate of tempering medium against the opposite major surfaces of the glass sheets than one gets from valving branch conduits in order to prevent side-to-side swaying of the glass sheets during quenching, particularly when the sheets are curved. Such means to provide fine control is also useful in quenching glass sheets supported in other than vertical orientations during quenching.

12 Claims, 3 Drawing Figures

CONTROLLING GLASS SHEET BUFFETING DURING QUENCHING

BACKGROUND OF THE INVENTION

1. Field of the Invention

A technique commonly employed in the art for tempering glass sheets, especially when the sheets are to be bent and then tempered, is to vertically hang each glass sheet from tongs which grip the upper marginal edge portion of the glass sheet, whereby the glass sheet may be conveyed while thus suspended through heating, bending, and tempering steps. Tongs of this type are disclosed in U.S. Pat. No. 3,089,727 to W. J. Hay. The heating step entails suspending the glass sheets within a heating chamber until the temperature of the glass approaches its softening point, and then each sheet in series is conveyed out of the heating chamber and (optionally) into a bending station. A typical vertical bending operation is disclosed in U.S. Pat. No. 3,367,764 to S. L. Seymour, wherein a heat-softened glass sheet is bent by being pressed between a pair of complementary, horizontally reciprocated bending molds. After bending, with the glass sheet still at an elevated temperature, the sheet is conveyed into a tempering station where it is rapidly cooled by applying blasts of tempering medium against the opposite major surfaces of the hot glass sheet so as to establish compressive stresses in the surface portions of the sheet, thereby strengthening the sheet. The tempering medium is usually air, but as used herein, the term may encompass any fluid capable of cooling a hot glass sheet. Such a process has proved to be an economical, high speed method for mass-producing tempered glass sheets, especially bent and tempered automotive glazing and the like.

Apparatus for tempering glass sheets suspended from tongs usually comprises a source of pressurized air which supplies air under pressure through a main supply pipe to a pair of branch conduits. The latter are as identical to one another as possible and each leads to a plenum chamber or reservoir for supplying pressurized air to a series of quench modules that faces one or the other major surface of the glass sheet. A slight difference in pressure is needed to quench shaped glass sheets. In the past, gate valves have been installed in the branch conduits to provide individual pressure control for tempering medium applied to each side of the glass sheet so as to equalize the net force of impingement on the convex and concave surfaces of the bent glass sheet or to overcome any imbalance of force of air supplied to the opposite surfaces that may develop.

One difficulty encountered with tempering glass sheets freely hung from tongs is that directing blasts of tempering medium onto the glass sheets can sometimes cause the glass sheets to sway from side to side. Previous measures such as installing gate valves in the branch conduits, taken to equalize the force of the impingement on both sides of the glass sheet, have not been completely successful because it is virtually impossible to precisely duplicate flow conditions on both sides of a glass sheet, particularly if it is bent with prior art glass sheet tempering apparatus. As a result, sharp side-to-side oscillations of the glass sheet and the tongs are induced.

This buffeting of the glass sheets impedes uniform application of the tempering medium onto the glass sheets, which in turn leads to imbalanced stresses in the tempered product. Such uneven stresses can result in the tempered glass sheet failing to meet strength specifications and may even cause glass breakage during processing. The problem of buffeting is especially troublesome with thin glass (i.e., glass about 4 millimeters or less in thickness), the demand for which has been increasing for use in automobiles. Not only is thin glass lighter in weight and thus more susceptible to buffeting, but also the need for faster rates of cooling to temper thin glass entails the use of higher pressure blasts of tempering medium, which additionally increases the amount of buffeting.

When tempering medium is applied against the opposite glass sheet surfaces, it is also important to control the relative flow rates against the opposite surfaces as well as the absolute flow rate of tempering medium against each glass sheet surface regardless of the orientation plane in which the glass sheet is supported during quenching.

2. Description of the Pertinent Prior Art

Efforts to reduce buffeting in the prior art have included the use of guide wires extending through a quenching apparatus as shown in U.S. Pat. No. 4,006,002 to Hetman, but such an approach has not been found adequate to stabilize glass sheets in the quench to the extent desired.

A further improvement in controlling buffeting is found in U.S. Pat. No. 4,119,423 to Seymour, which provides lateral restraining means to control side-to-side swaying of the tongs and optional glass sheet restraining means in the form of thin, taut guide wires.

In other glass sheet quenching operations, glass sheets are supported in a substantially horizontal plane during quenching. These horizontal supports may include finger supports for the glass sheet as in U.S. Pat. No. 3,455,672 to Dompkowski or roller supports as in U.S. Pat. No. 3,223,498 to Davidson or ring-like supports as in U.S. Pat. No. 3,846,104 to Seymour. In other glass sheet quenching operations, glass sheets are supported in an oblique plane as in U.S. Pat. No. 2,608,030 to Jendrisak.

In all of these quenching operations, it is important to control the flow rate of tempering medium applied against the opposite glass sheet surfaces. In the past, massive control valves such as gate valves, have been used to throttle the flow of tempering medium against each side of the glass sheet during quenching. Such gross control is not fine enough to provide the necessary control of buffeting and also leaves other factors in tempering glass sheets that can be improved.

SUMMARY OF THE INVENTION

In the present invention, fluid control means capable of finer adjustment than is available in the prior art are provided in a glass sheet tempering apparatus to reduce side-to-side buffeting of the glass sheets and improve the uniformity with which tempering medium is directed onto the opposite major glass sheet surfaces. The means preferably take the form of a small cross-section bypass pipe parallel to at least one of the branch conduits of larger cross-section to provide a vernier adjustment of the air flow through one of the branch conduits whenever glass sheet fluttering develops. The invention is especially useful in connection with the tempering of thin, bent glass sheets with high pressure blasts of tempering medium, but can also be used to improve the tempering of glass sheets supported in non-vertical orientations, and will be understood more clearly in the light of a description of an illustrative embodiment that follows.

THE DRAWINGS

In the drawings that form part of said description,

DETAILED DESCRIPTION

Figure 1:
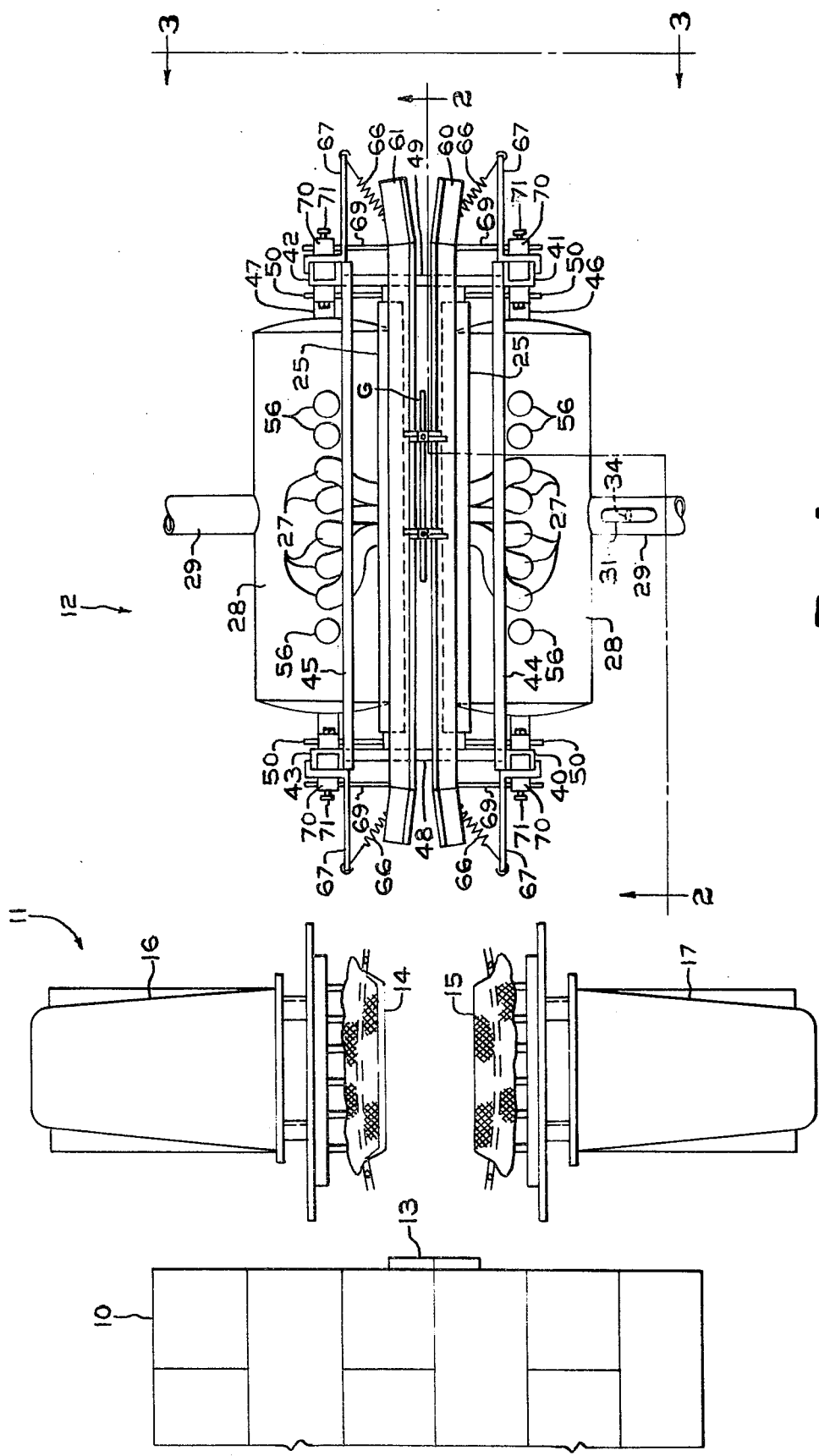
FIG. 1 is a plan view of a typical glass sheet bending and tempering operation, showing the exit end of a heating furnace, a press bending station, and a quenching station which serves as an environment for the present invention.

In FIG. 1, there is shown a general layout of a typical glass sheet bending and tempering operation wherein a series of tong-supported glass sheets are heated in a furnace 10 and then conveyed in sequence to a press bending station 11 and a quenching station 12. The specific arrangement shown and described in detail herein is merely typical of the type of operation in which the present invention may find utility. It should be clear that the present invention relates to any arrangement wherein glass is vertically hung from tongs as it is being tempered. While such an arrangement is most typically employed for bending and tempering glass sheets, a bending step may be considered optional for the purposes of the present invention.

In the specific embodiment of FIG. 1, each glass sheet is continuously conveyed by tongs through furnace 10 where they are heated to a temperature near the softening point of the glass (e.g., about 1200° F., 650° C.). Through each step the glass sheets are maintained with their major surfaces generally parallel to their direction of travel. Each glass sheet leaves the furnace through an exit door 13 and is conveyed into bending station 11 where it is stopped between a pair of complementary shaping members 14 and 15. The shaping station shown is of the type disclosed in U.S. Pat. No. 3,367,764 to S. L. Seymour, and reference may be had thereto for further details of its construction and operation. Briefly, the shaping members 14 and 15 are covered with a knitted fiber glass fabric, preferably of the type disclosed in U.S. Pat. No. 3,148,968 to J. H. Cypher and C. E. Valchar and are carried on opposed, horizontally reciprocating presses 16 and 17. After the glass sheet has been bent to the desired shape, it is conveyed into the quenching station 12. Sufficient heat is imparted to the glass in the furnace so that it enters the quenching station before it has cooled below a temperature suitable for tempering.

Figure 2:
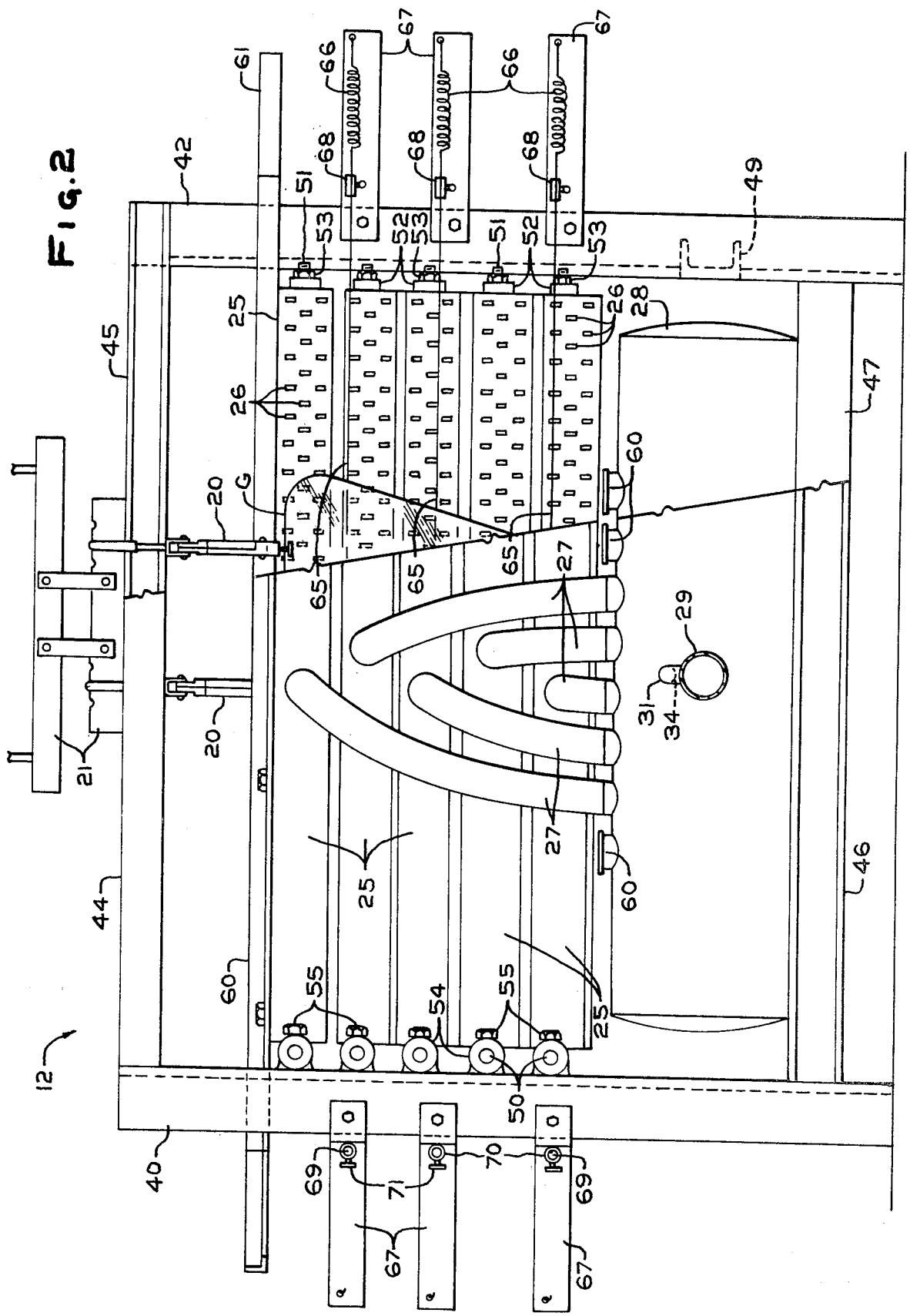
FIG. 2 is a side view, partially broken away, of the quenching station of FIG. 1 taken along lines 2—2 in FIG. 1.
Figure 3:
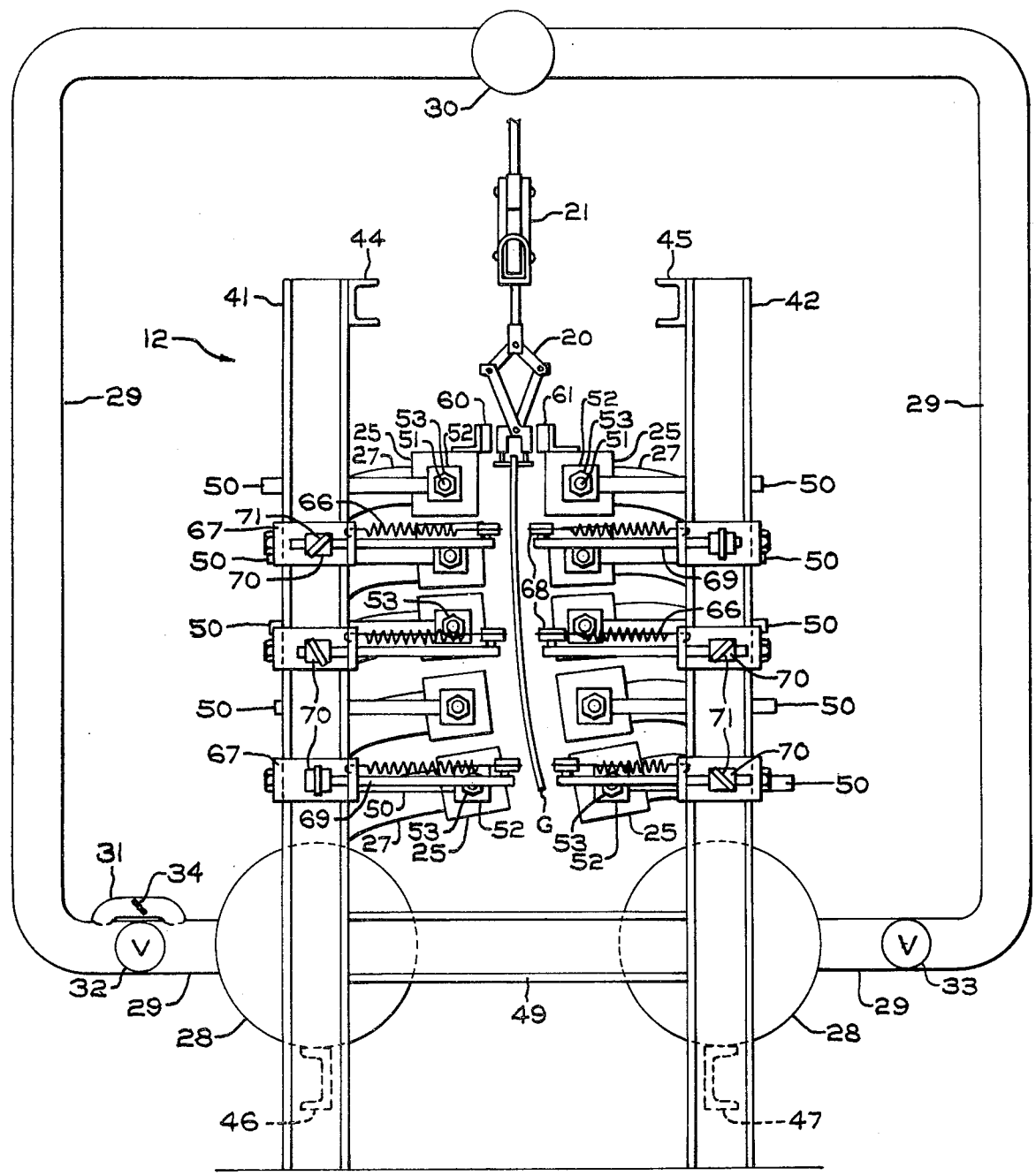
FIG. 3 is an end view of the quenching station of FIG. 1 taken along lines 3—3 in FIG. 1.

In the drawings, a sheet of glass G on a pair of tongs 20 is shown passing through the quenching station. For the sake of clarity, the overhead support means for the tongs and the conveying means have not been shown in FIG. 1. As can be seen in FIGS. 2 and 3, the tongs are carried by an overhead carriage assembly 21 which rides on a suitable conveyor means, such as a stub roll conveyor (not shown), which extends overhead in the longitudinal direction (the direction of glass travel) through the furnace and over the bending station and the quenching station. Details of the tong construction itself may be found in U.S. Pat. No. 3,089,727 to W. J. Hay.

The particular quenching apparatus depicted in the drawings is particularly suited for directing high pressure blasts of air onto relatively thin sheets of glass for imparting a high degree of temper thereto. Referring now to FIGS. 2 and 3 in particular, it may be seen that the quenching apparatus centers around a series of horizontally extending quench modules 25 stacked vertically in opposing banks on opposite sides of the path of glass travel. Each of the quench modules, on its glass-facing surface, includes a large number of staggered, slot-shaped orifices 26 from which high pressure blasts of air issue. The hollow interior of each quench module 25 is supplied with pressured air through a flexible conduit 27 which leads from one of a pair of air reservoirs 28. The reservoirs 28 are, in turn, supplied with pressurized air from an air compressor (not shown) by way of branch conduits 29, which have a relatively large cross-section and are constructed and arranged to divide air from a main supply pipe 30 so as to deliver equal amounts of air flow to each reservoir in the absence of any valve control. A bypass line 31 of relatively small cross-section bypasses a valve means 32 provided in the branch conduit 29 that delivers air to the quench modules 25 whose slot shaped orifices face the convex glass sheet surface and a similar valve means 33 is provided in the other branch conduit, which need not be provided with a bypass line. A small valve 34 is located in the bypass line 31 according to the present invention to provide means to finely adjust the relative air flow rates to the opposite air reservoirs 28 by a minor amount.

A typical arrangement for apparatus provided with the present invention comprises 6 inch schedule 40 pipe for the main supply pipe 30, 4 inch schedule 40 pipe for the branch conduits 29, 1¼ inch schedule 40 pipe for the bypass line 31 and 16 inch schedule 40 pipe for the air reservoirs 28. Valve means 33 is adjusted to control the pressure in the reservoir facing the concave glass surface to 6 p.s.i., while valve 34 is set to its midway position and valve means 32 is set so that the pressure in the reservoir facing the convex glass surface is 7 p.s.i. Valve means 32 and 33 are conventional gate valves capable of making gross changes in pressure supply to reservoirs 28, but are not capable of the fine adjustment characteristic of valve 34. While valve means 32 and 33 are limited to controllable gross changes of 4 ounces per square inch, valve 34 can be adjusted to change the pressure in the reservoir 28 by 1 ounce per square inch or less and has a range of about 6 ounces per square inch of pressure control.

Adequate temper is obtained with the aforementioned combination of grossly adjusted pressures against the opposite curved surfaces of glass sheets conforming to a particular sample pattern having a nominal thickness of ⅛ inch (3 mm) when the quench modules are located with a horizontal space of 4 inches (10 cm) therebetween on opposite sides of the position occupied by the glass sheet to be quenched. The quenching apparatus is thus approximately set for this particular pattern.

When a glass sheet is heated, press bent and quenched with the apparatus set as mentioned previously, if buffeting occurs, it can be reduced by proper adjustment of small magnitude of the small valve 34 in the bypass pipe 31. If the relative adjustments of the gross control valve means 32 and 33 are too far removed from the proper relative settings, either gross adjustment valve means can be adjusted grossly to provide an approximately proper difference in pressures provided in the opposite air reservoirs 28. In order to insure maximum adjustability of the small valve 34, it is recommended that the small valve 34 be reset to its middle position before making any gross adjustment in gross adjustment valve means 32 or 33. Both gross adjustment valve means may have to be adjusted to provide the proper level of pressure in the reservoirs 28. Valve 34 is merely used to adjust the pressure differential between opposite reservoirs to reduce buffeting.

In a preferred embodiment of this invention, the valve means 32 and 33 for branch conduits 29 were 4 inch gate valves sold by the Fairbanks Co., Binghamton, N.Y., under the designation 4 inch gate valve #125-S, 200 WOG, while the small valve 34 for the bypass pipe 31 was obtained from North American Manufacturing Company, Cleveland, Ohio, under the designation adjustable port valve #1005-2.

An advantageous feature of the quenching apparatus shown in the drawings is its wide range of adaptability to varying sizes and shapes of glass sheets. The quench modules are mounted in a free-floating fashion to a rigid frame so that their elevation and lateral position, as well as their angular attitude, may be readily altered without the need for substantial reconstruction of the quenching apparatus. The rigid frame consists of four corner posts 40, 41, 42, and 43 joined by a pair of upper longitudinal cross-braces 44 and 45, a pair of lower longitudinal cross-braces 46 and 47, and a pair of transverse cross-braces 48 and 49.

Each quench module 25 is mounted onto the frame independently by way of a pair of horizontally extending rods 50. Each end of each quench module 25 is rotatably joined to one of the rods 50 by means of threaded mounting post 51 extending from the end of the quench module. Each mounting post 51 is journaled in a bearing block 52 affixed to the inner end of the respective rod 50. The angular position of the quench modules is fixed by tightening nuts 53 which are threaded onto the end of the mounting posts 51. The opposite end of each rod 50 is received in a sleeve 54 which is affixed to one of the frame corner posts. A set screw 55 extends through each sleeve 54 to lock each rod 50 in place. By this arrangement, the glass-to-quench module spacing may be easily adjusted by loosening the set screws 55 and sliding rods 50. The angle at which the air blasts are directed toward the glass sheet may be adjusted by loosening nuts 53.

The height of the quenching area may be altered by adding additional quench modules or by removing quench modules. For example, in the apparatus illustrated in the drawings, the frame is adapted to receive up to about 3 additional quench modules, and the air reservoirs 28 are shown as having extra ports 56 (shown capped) which may be employed to supply pressurized air to such additional quench modules. By thus providing a close correspondence between the height of the quench area and the height of the glass sheets being processed, maximum efficiency in the use of compressed air is attained.

When a glass sheet enters the space between the opposed banks of quench modules 25, it is impinged on both sides with blasts of tempering medium from orifices 26. Any undesirable buffeting of the glass sheet not controlled by adjustment of butterfly valve 34 from its half-open position is counteracted in the present apparatus by means of a pair of tong guide members 60 and 61 which flank the path taken by a lower portion of the tongs as they pass through the quench in the longitudinal direction. The tong guides may take the form of any rigidly supported member which will prevent the tongs from swinging laterally to an appreciable extent. The spacing between the barriers should be just slightly wider than the width of the portion of the tongs lying between the barriers, thereby permitting the tongs to move freely in the longitudinal direction while limiting lateral movement of the tongs. In the preferred embodiment shown, each guide member takes the form of an elongated strip of lightweight sheet metal bent to an L-shaped cross section which may be bolted to the top of one of the upper quench modules 25. The guide means extend at least the full length of the quench and preferably slightly beyond both ends of the quench and may be provided with flared entrance and exit throats in order to avoid snagging the tongs.

A specific tong construction and its preferred alignment with the tong guide means have been illustrated in the drawings, but it should be understood that other tong configurations may be used, in which case the alignment between the tongs and the tong guides must be determined on an individual basis. In general, the alignment should be chosen to limit contact to the lower portions of the tongs, since the lower portions have the greatest freedom of movement and since pressure on the sides of the upper portions could cause the tongs to lose their grip on the glass.

The tong guide means of the present apparatus may advantageously be deployed in combination with a plurality of guide wires 65, which extend horizontally through the quench between the opposing banks of quench modules and on opposite sides of and parallel to the path taken by the glass sheets passing through the quench. These wires limit lateral motion of the glass sheets without significantly blocking the flow of quenching medium. Each guide wire 65 is maintained taut by a pair of springs 66 which draw the wire against grooved guide rollers 68 at opposite ends of the wire.

In the preferred embodiment shown in the drawings, the quench apparatus includes an advantageous, self-contained mounting arrangement for the guide wires which permits a wide range of adaptability to different sizes and shapes of glass sheets. Each end of each guide wire is provided with a mounting bracket 67, which includes a longitudinally extended arm to which the outer end of each spring 66 is attached and a bifurcated opposite end which is bolted to one of the frame corner posts 40, 41, 42, or 43. Each guide roller 68 is rotatably carried at the end of an extension rod 69 which is mounted for adjustment in the horizontal direction transverse to the direction of glass travel. Each extension rod 69 extends through a bore in the longitudinal arm of respective mounting bracket 67 and through a sleeve 70 carried on the bifurcated portion of the mounting bracket. The transverse location of each roller may be fixed by tightening a set screw 71 which is threaded through each sleeve 70. Thus, the elevation of the guide wires may be changed to accommodate taller or shorter sheets of glass simply by relocating the mounting brackets 67 on the corner posts of the frame, and the horizontal location of the guide wires may be adjusted to closely correspond to any given contour of bent glass sheets by extending or retracting the extension rods 69.

The tong guide members 60 and 61 and the optional guide wires 65 are included for insurance purposes only, because the bypass valve line 31 and the small valve 34 are capable of making adjustments in the total flow of air to the reservoir 28 facing the convex glass sheet surface so tiny that buffeting is more likely to be controlled than was the case with adjustments made through gross adjustment valve means 32 or 33, which could not be controlled so closely. Hence, the tong guide members 60 and 61 and the guide wires 65 may be omitted, if desired.

Furthermore, while only one of the branch conduits is shown provided with a bypass valve line, it is understood that both branch conduits can be provided with a bypass valve line, thereby, in effect doubling the effecting range of fine adjustment available from the small valves 34, provided both small valves are initially adjusted in their center positions to provide maximum range of fine adjustment increase or decrease of pressure resulting in each reservoir 28.

While the present invention is especially useful in quenching glass sheets suspended vertically from tongs, the orientation of the glass sheets and their manner of support during quenching is immaterial. The present invention is useful in improving the fineness of control of blasts of tempering medium applied against opposite glass sheet surfaces wherever such finer control is desirable.

It should be understood that other variations and modifications as are known to those of skill in the art may be resorted to without departing from the spirit and scope of the invention as defined by the appended claims.

I claim:

1. An apparatus for tempering glass sheets comprising:
   a furnace adapted to heat glass sheets to a temperature suitable for tempering;
   a quenching station including a pair of opposed arrays of orifices adapted to direct blasts of tempering medium in a generally horizontal direction from opposite banks of quench modules onto opposite surfaces of a glass sheet received therebetween, each bank of quench modules receiving tempering medium under pressure from a reservoir; and
   means for conveying a glass sheet from the furnace into the quench station along a longitudinal path between said arrays of modules, said conveying means including freely hanging tongs adapted to grip an upper marginal edge portion of a glass sheet so as to support the glass sheet in a generally vertical disposition;
   means to supply tempering medium comprising blower means, a main supply pipe communicating with said blower means, a pair of branch conduits of relatively large cross-section, one of the latter supplying tempering medium to one of said reservoirs and the other of the latter supplying tempering medium to the other of said reservoirs, valve means capable of gross adjustment only in each branch conduit providing gross control of the tempering medium pressure said branch conduits supply to said reservoirs, a bypass pipe of relatively small cross-section bypassing the portion of at least one of said branch conduits containing its said valve means, and a relatively small valve capable of fine adjustment to apply fine control of the tempering medium pressure supply in said reservoir supplied by said branch conduit provided with said bypass pipe.

2. The apparatus of claim 1 wherein said small valve in said bypass pipe is capable of adjusting the pressure of tempering medium in said associated reservoir over a range of pressure greater than the smallest controllable change of pressure readily available from said valve means capable of gross adjustment.

3. The apparatus as in claim 1, further including rigid guide means mounted above said arrays of nozzles and parallel to and flanking said path taken by said tongs through said quenching station, said guide means being located to face lower end portions of said tongs passing through said quenching station in closely spaced relation thereto so as to closely limit transverse motions in said tongs.

4. The apparatus of claim 1 or claim 3 wherein said quenching station further includes a plurality of guide wires extending horizontally between said arrays of modules closely adjacent and parallel to the path taken by the glass sheets passed through the quenching station adapted to closely limit transverse motions of the glass sheets.

5. A method of tempering a series of glass sheets comprising:
   gripping an upper marginal edge portion of each glass sheet with tongs so as to support each glass sheet in a generally vertical position;
   while thus supported, conveying each glass sheet along a longitudinal path through a heating chamber wherein the glass is heated to a temperature suitable for tempering and then through a quenching station wherein blasts of tempering medium of controlled pressure are directed via branch conduits provided with valve means capable of rough adjustment only onto opposite sides of each glass sheet to impart a temper thereto;
   wherein the improvement comprises reducing buffeting of the glass sheets by the blasts of tempering medium by diverting part of said tempering medium directed onto one side of each glass sheet through a bypass pipe provided with a valve capable of fine adjustment in bypassing relation to the valved portion of said branch conduit that supplies tempering medium on said side and finely adjusting the valve in said bypass pipe until said buffeting is reduced.

6. The method of claim 5 wherein buffeting of the glass sheets by the blasts of tempering medium is further reduced by restricting side-to-side motions of the tongs with rigid tong guide means closely spaced from and flanking the path taken by the tongs through the quenching station.

7. The method of claim 5 or claim 6 wherein buffeting of the glass sheets by the blasts of tempering medium is further reduced by restricting side-to-side motions of the glass sheets with guide wires extending longitudinally through the quenching station closely spaced from the path taken by the glass sheets through the quenching station.

8. The method of claim 5 wherein the glass sheets are bent after leaving the heating chamber and before entering the quenching station.

9. The method of claim 5 wherein the glass sheets are no more than about 4 millimeters in thickness.

10. An apparatus for tempering glass sheets comprising:
   a furnace adapted to heat glass sheets to a temperature suitable for tempering;
   a quenching station including a pair of opposed arrays of orifices adapted to direct blasts of tempering medium from opposite banks of quench modules onto opposite surfaces of a glass sheet received therebetween, each bank of quench modules receiving tempering medium under pressure from a reservoir; and means for conveying a glass sheet from the furnace into the quench station along a longitudinal path between said arrays of modules, said conveying means including means to support the glass sheet in a given plane between said quench modules;

means to supply tempering medium comprising blower means, a main supply pipe communicating with said blower means, a pair of branch conduits of relatively large cross-section, one of the latter supplying tempering medium to one of said reservoirs and the other of the latter supplying tempering medium to the other of said reservoirs, valve means capable of gross adjustment only in each branch conduit providing gross control of the tempering medium pressure said branch conduits supply to said reservoirs, a bypass pipe of relatively small cross-section bypassing the portion of at least one of said branch conduits containing its said valve means, and a relatively small valve capable of fine adjustment to apply fine control of the tempering medium pressure supply in said reservoir supplied by said branch conduit provided with said bypass pipe.

11. A method of tempering a series of glass sheets comprising:

supporting each glass sheet for conveyance along a longitudinal path through a heating chamber wherein the glass is heated to a temperature suitable for tempering and then through a quenching station wherein blasts of tempering medium of controlled pressure are directed through a pair of arrays of orifices supplied thereto via branch conduits having relatively large cross-sections and provided with valve means capable of rough adjustment only onto opposite sides of each glass sheet to impart a temper thereto;

and supporting said glass sheet in a given orientation between said arrays;

the improvement comprising diverting part of said tempering medium directed onto one side of each glass sheet through a bypass pipe of relatively small cross-section and provided with a valve capable of fine adjustment in bypassing relation to the valved portion of said branch conduit that supplies tempering medium to said side and finely adjusting the valve in said bypass pipe until the total flow of tempering medium through one of said branch conduits and its bypass pipe is adjusted to a closer approximation to a desired value than is possible in the absence of said bypass pipe.

12. The improvement as in claim 11, wherein said valve in said bypass pipe is initially adjusted to approximately its central position to provide maximum range for said fine adjustment.

* * * * *